G. A. MAXWELL.
MEANS FOR APPLYING POWER TO TANDEM COUPLED VEHICLES AND BRAKE MECHANISM THEREFOR.
APPLICATION FILED APR. 19, 1915.
1,305,228.
Patented May 27, 1919.
3 SHEETS—SHEET 1.
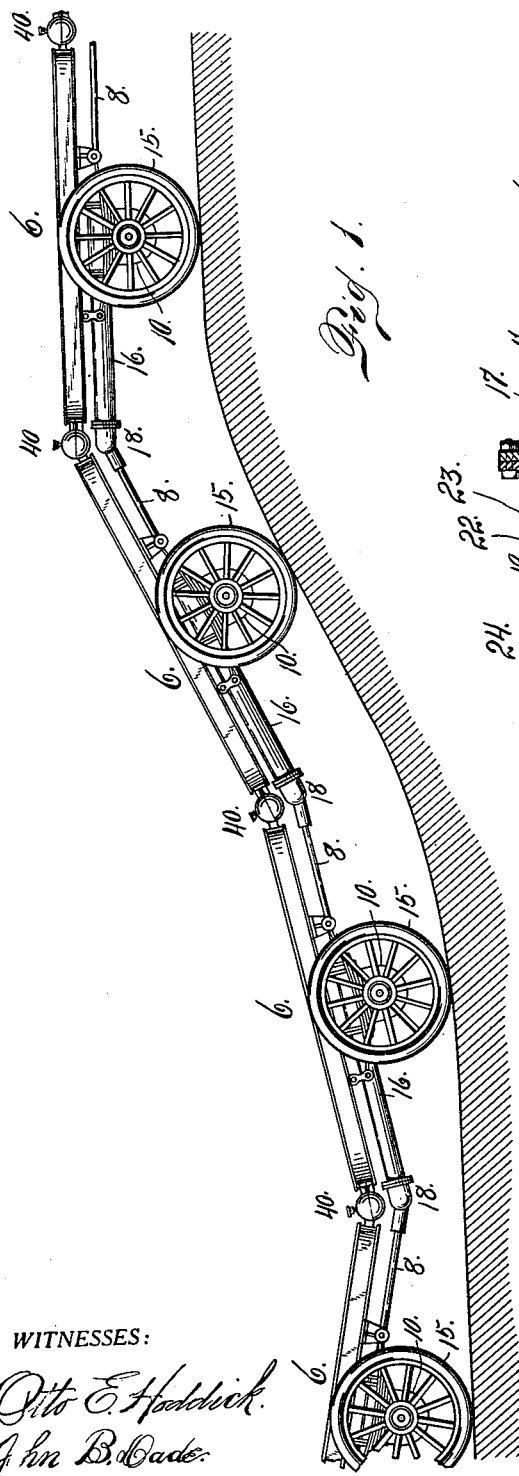
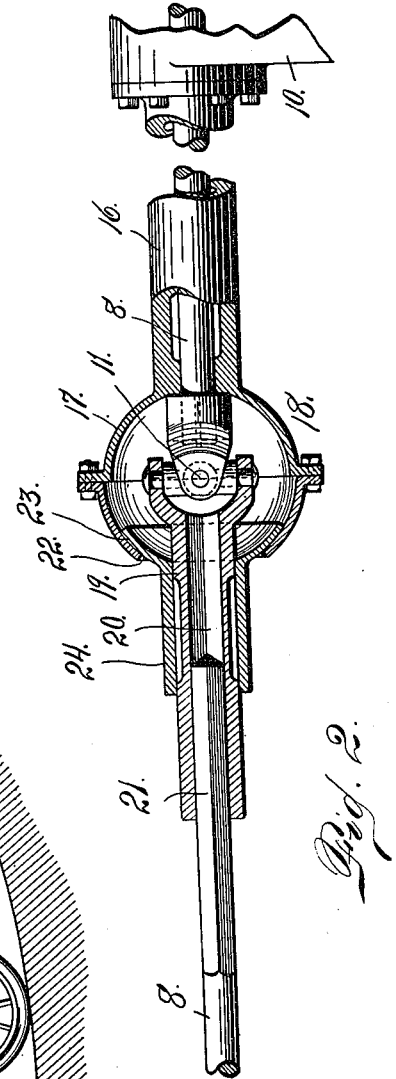
WITNESSES:
Otto E. Haddick.
John B. Cade.
INVENTOR.
Glea A. Maxwell.
By
ATTORNEY G. A. MAXWELL.
MEANS FOR APPLYING POWER TO TANDEM COUPLED VEHICLES AND BRAKE MECHANISM THEREFOR.
APPLICATION FILED APR. 19, 1915.
1,305,228.
Patented May 27, 1919.
3 SHEETS—SHEET 2.
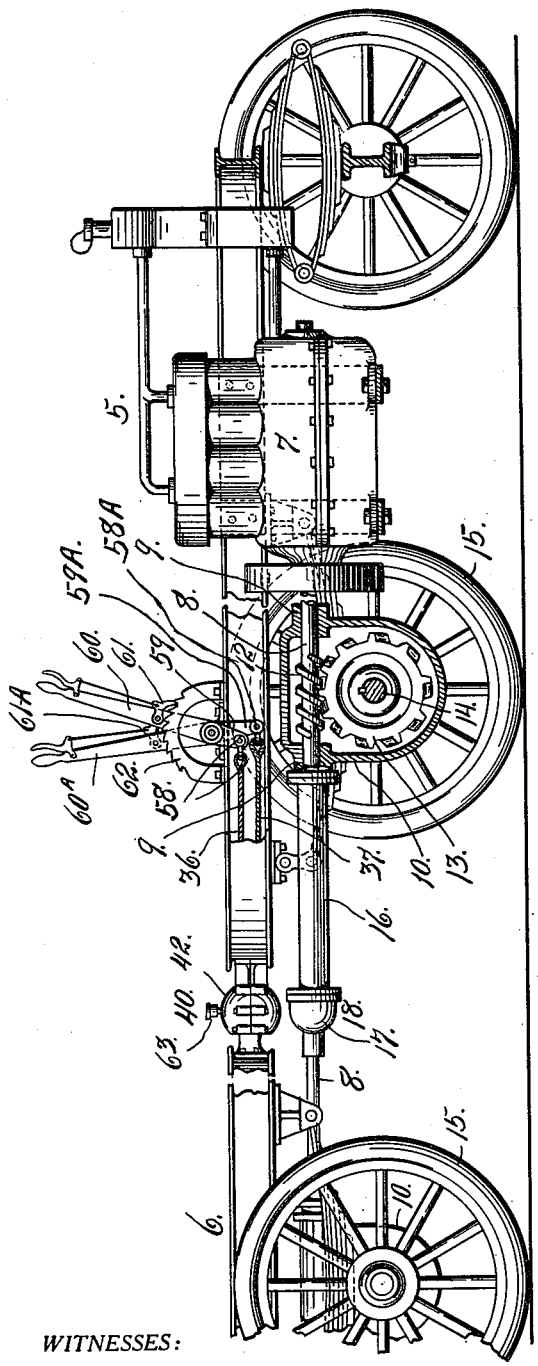
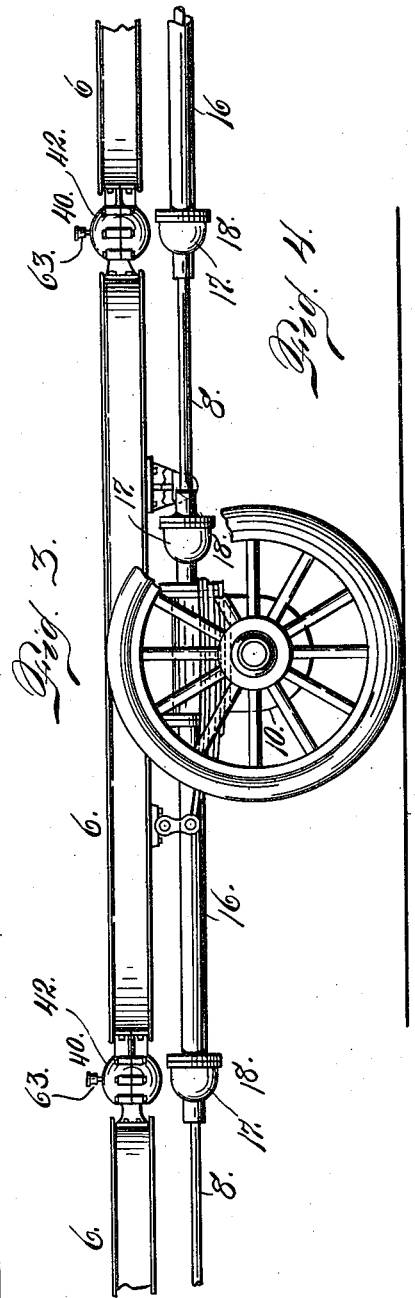
WITNESSES:
Otto E. Hoddick.
John B. Wade.
INVENTOR.
Glea A. Maxwell.
By
ATTORNEY

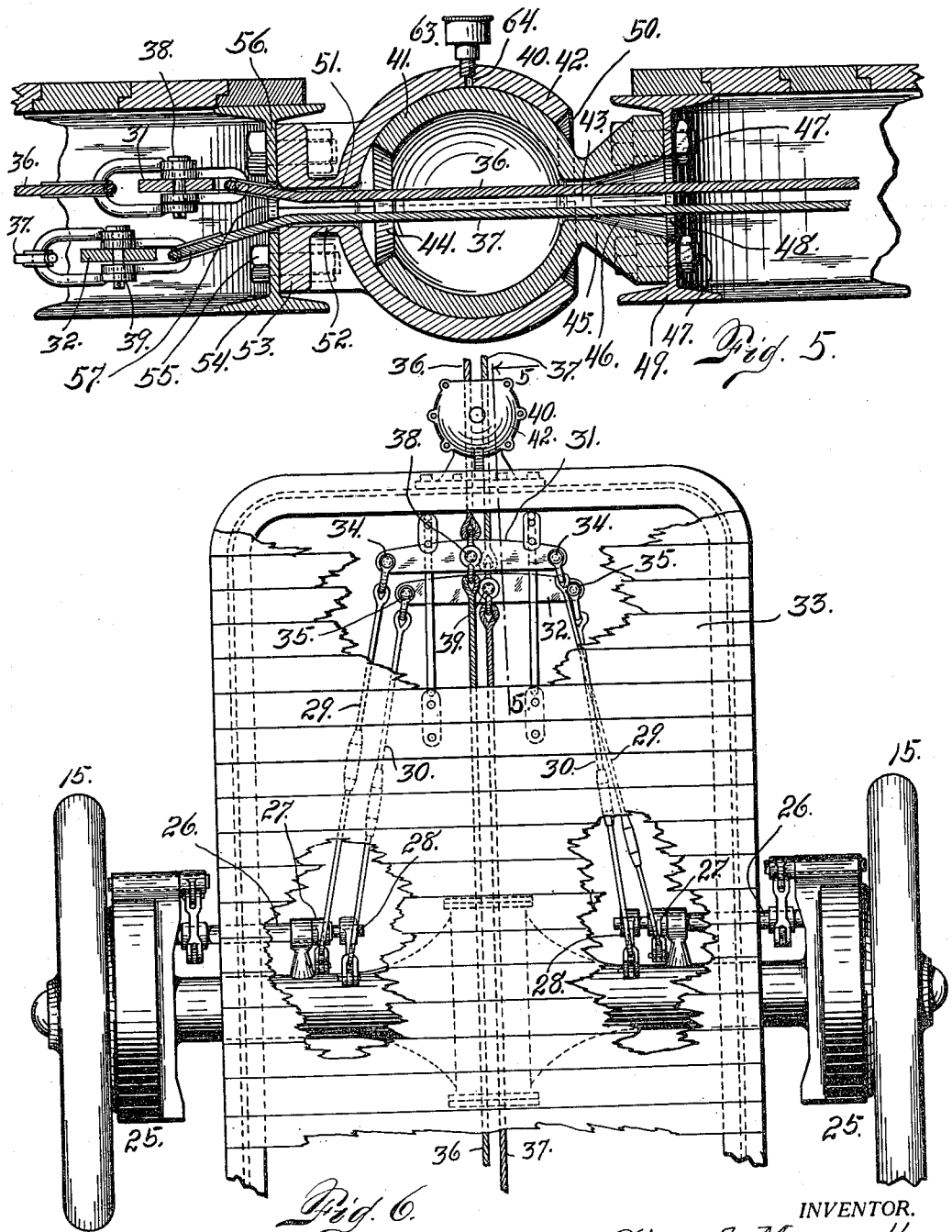

UNITED STATES PATENT OFFICE.

GLEA A. MAXWELL, OF DENVER, COLORADO, ASSIGNOR OF ONE-HALF TO FRED B. CHAMBERLIN, OF DENVER, COLORADO.

MEANS FOR APPLYING POWER TO TANDEM-COUPLED VEHICLES AND BRAKE MECHANISM THEREFOR.

1,305,228.  Specification of Letters Patent.  Patented May 27, 1919.

Application filed April 19, 1915. Serial No. 22,471.

*To all whom it may concern:*

Be it known that I, GLEA A. MAXWELL, a citizen of the United States, residing in the city and county of Denver and State of Colorado, have invented certain new and useful Improvements in Means for Applying Power to Tandem-Coupled Vehicles and Brake Mechanism Therefor; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to means for applying power to a series of coupled vehicles arranged in tandem relation and also to brake mechanism for such a train of vehicles. My improvement includes the mounting of a prime motor, as an internal combustion engine, on one of the vehicles, as the foremost one, and applying the power of this motor or engine to each vehicle individually, as distinguished from a construction in which the power is applied to the foremost vehicle only, while the other vehicles simply act in the capacity of trailers. My improved means consists of a shaft arranged longitudinally of each vehicle and connected in operative relation with an axle thereof as by the use of a worm gear, the operating shafts of the several vehicles being connected between the vehicles by universal joints, the shaft upon the foremost vehicle being directly operated from the engine or connected in operative relation with the engine shaft.

The brake mechanism consists of cables passing through universal joint connections between the vehicles, said connections being supported by the bodies of the vehicles. The cables are connected with brake levers carried by each vehicle for applying brakes to a set of wheels of the vehicle, these cables being connected with operating levers mounted on the foremost vehicle of the set. By virtue of this arrangement, the person in charge of the train of vehicles may apply the brakes directly to a set of wheels upon each vehicle by manipulating the levers mounted on the foremost vehicle.

Having briefly outlined my improvement, I will proceed to describe the same in detail, reference being made to the accompanying drawing in which is illustrated an embodiment thereof. In this drawing,—

Figure 1 is a side elevation of a train of vehicles equipped with my improved power and brake mechanism.

Fig. 2 is a section taken through one of the universal joints arranged between each two vehicles and through which the power from the engine is transmitted from the operating shaft of one vehicle to the corresponding shaft of the other vehicle, the parts being shown on a larger scale.

Fig. 3 is a side elevation partly in section, illustrating the foremost or power vehicle and the forward portion of the vehicle immediately in the rear, shown on a larger scale than in Fig. 1.

Fig. 4 is a view illustrating a single vehicle together with the universal joint connections for brake and power purposes at its opposite ends.

Fig. 5 is a horizontal section taken through one of the universal joints of the brake mechanism, the parts being shown on a larger scale. This is a section taken approximately on the line 5—5, Fig. 6, looking toward the left.

Fig. 6 is a fragmentary top plan view of a portion of one of the vehicles, illustrating the brake mechanism shown on a larger scale than Figs. 1, 3 and 4, and on a smaller scale than Fig. 5.

The same reference characters indicate corresponding parts in all the views.

Let the numeral 5 designate the foremost vehicle of a train, each vehicle in the rear being designated in its entirety by the numeral 6. Upon the foremost vehicle is mounted a motor as an internal combustion engine 7, whose shaft is connected in operative relation with a vehicle shaft 8 which is journaled as shown at 9 in a housing or gear case 10. This shaft 8 is equipped with a worm 12 which engages a worm wheel 13 fast on the axle 14 to which is made fast wheels 15. This worm gearing is inclosed by the housing. The rear portion of the shaft 8 passes through a stationary sleeve 16 whose rear extremity merges into an approximately spherical housing 17 forming a part of a universal joint 18. The rear extremity of the shaft 8 has a universal joint connection 11 with a hollow shaft member 19, the hollow or longitudinal perforation of this shaft being polygonal, preferably square in cross section, as shown at 20, and adapted to receive a part 21 of counterpart shape, forming a part of the operating shaft 8 of the car next in the rear.

Hence, it may be assumed that the operating shaft of each vehicle is of the same construction and consequently designated by the numeral 8. The rear extremity of the operating shaft 8 of any vehicle has a universal joint connection with the forward extremity of the operating shaft of an adjacent vehicle, this connection in each case being inclosed by an approximately spherical housing 17. This housing 17 is open at the rear as shown at 22 and within its rear portion is arranged a coöperating segment 23 having an exposed sleeve member 24 in which the hollow shaft member 19 fits. This terminal segment 23 of the sleeve 24 is so connected with the hollow shaft member 19 as to permit the necessary movement, whereby there is a flexible joint or coupling between each two vehicles for power-transmitting purposes, and of such character as to compensate for the necessary variation in the positions of the several vehicles of a train in passing over uneven or rolling surfaces (see Fig. 1).

From the foregoing description, it will be understood that the shafts 8 of all the vehicles are connected in operative relation with the engine 7, and that each operating shaft 8 has a worm gear connection with the axle 14 of its corresponding vehicle.

Each vehicle or unit of the train is also equipped with braking apparatus which is applied to the wheels 15 thereof in any suitable manner. As illustrated in the drawing, the wheels are equipped with band brakes 25, the latter being connected in operative relation with a rock shaft 26 which is equipped with crank arms 27 and 28. There is, of course, a set of band brakes for each wheel and consequently a rock shaft 26 on each side of the vehicle. With these crank arms 27 and 28 are connected brake rods 29 and 30, their opposite extremities being connected with brake levers 31 and 32 which are centrally located beneath the floor 33 of the vehicle. To the opposite extremities of the brake lever 31 are respectively secured, as shown at 34, the forward extremities of the two brake rods 29; while to the opposite extremities of the brake lever 32 are secured as shown at 35, the forward extremities of the brake rods 30. These two brake levers 31 and 32 of each vehicle are respectively connected with cables 36 and 37, the cable connection in each case being a central pivot, the two pivots being designated by the numerals 38 and 39, respectively.

These two cables extend practically the entire length of the train of vehicles and pass through couplings 40 located between the vehicles and composed of interiorly and exteriorly located hollow ball members 41 and 42. The interior ball member 41 (see Fig. 5) fits within the exterior ball member 42 and is adapted to move freely therein to permit the change of direction of the vehicles either upwardly or downwardly or laterally, as may be required. The interior member is open at both extremities as shown at 43 and 44 to allow the cables 36 and 37 to pass through from one vehicle to the other. This interior member merges at one extremity into a block 45 which is provided with a frustum shaped opening 46 which registers with the opening 36 in the ball member 41. The enlargement of the opening 46 as it extends inwardly toward the vehicle permits the change of direction of any vehicle with reference to the adjacent vehicle either vertically or laterally, as will be understood. The block 45 is secured to the framework of the vehicle my means of bolts 47 or in any other suitable manner. The opening 46 registers at its larger extremity with an opening 48 of corresponding size formed in the I-beam structure 49 of the framework of the vehicle.

The ball member 42 has openings 50 and 51 at its opposite extremities, the opening 50 being relatively large and corresponds with the relatively large opening 44 of the interior member 41, the large openings of the two ball members as well as the smaller openings 43 and 51 being oppositely disposed. The ball member 42 extends toward the vehicle 6 opposite that with which the block 45 of the member 41 is connected. This member 42 merges first into a neck 52 and finally into an expanded member or block 53 which is secured to the I-beam structure 54 of the vehicle by means of bolts 55. The opening 51 in the member 42 is continued through the neck 52 and the block 53. Furthermore, the web 56 of the I-beam member through which the fastening bolts 55 pass is also provided with an opening 57 which registers with the opening 51 of the ball member 42.

The extremities of the cables 36 and 37 where they extend inwardly beyond the opening 57 are respectively connected with the brake levers 31 and 32 as heretofore explained. This will be understood by comparing the two views 5 and 6.

The forward extremities of the cables 36 and 37 are connected as shown at 58 and 58ᴬ with lower arms 59 and 59ᴬ of operating levers 60 and 60ᴬ, respectively, mounted on the foremost vehicle and carrying pawls 61 and 61^A, respectively, engaging ratchet quadrants 62, one only being shown.

It will thus be seen that the cables 36 and 37 which extend practically the entire length of the train of vehicles as heretofore explained, are connected, respectively at their forward extremities with the operating levers 60 and 60^A, thus making it practicable to apply the brakes simultaneously to all the vehicles by the proper manipulation of a single lever or both levers simultaneously, as may be desired, mounted on the foremost vehicle. This is an important advantage since it prevents the bumping tendency of the rear vehicles of a train, assuming that the brakes are applied to the foremost vehicle only.

Attention is called to the fact that the universal joints 18 and 40 which form parts of the propelling mechanism and the brake mechanism, respectively, are arranged to coöperate with each other in order to allow the different vehicles of the train to occupy different positions either vertically or laterally as is necessary in passing over uneven ground and making turns. The exterior member 42 of each joint 40 is equipped with an oil cup or receptacle 63 which registers with an orifice 64 in the member 42, whereby lubricating material may be introduced.

The cables 36 and 37 may be operated either simultaneously in the case of emergency, or separately, as may be required, by the employment of the levers 60 and 60^A, which are respectively connected with the cables as heretofore described.

Attention is also called to the fact that the coupling connections between the vehicles which are employed both with the power and brake mechanism, are constructed to prevent lost motion or back lash, which is considered an important feature in apparatus of this character.

Having thus described my invention, what I claim is,—

1. A traction system for a plurality of tandem-coupled vehicles comprising a power driven shaft composed of flexibly connected units on the several vehicles, braking mechanism on each vehicle, a plurality of flexible couplings between the individual cars, establishing draft connections between the several vehicles and serving also to flexibly connect the several braking mechanisms and separate flexible couplings for connecting the power driven units.

2. A traction system for a plurality of tandem-coupled vehicles comprising a power driven shaft composed of flexibly connected units on the several vehicles, braking mechanism on each vehicle, a plurality of flexible couplings between the individual cars, establishing draft connections between the several vehicles and serving also to flexibly connect the several braking mechanisms, separate flexible couplings for connecting the power driven units, said couplings being disposed between the individual vehicles and in alinement with the first named flexible couplings.

3. A traction system comprising a tractor and a plurality of tandem coupled trailers, flexible hollow draft connections between said vehicles, and brake-operating mechanism extending through said flexible connections.

4. A traction system comprising a tractor and a plurality of tandem coupled trailers, flexible hollow draft connections between said vehicles and brake-operating mechanism for said tractor and trailers extending through said connections and operable from the tractor.

5. A traction system for a plurality of tandem coupled vehicles certain of which are two-wheeled vehicles, the system including flexible hollow couplings establishing draft connections between the vehicles, the couplings being such that the frame of one vehicle cannot move upon its axle as a pivot independently of the adjacent vehicle, and brake operating-mechanism extending through the flexible couplings.

In testimony whereof I affix my signature in presence of two witnesses.

GLEA A. MAXWELL.

Witnesses:
MAZE KIRBY,
A. EBERT O'BRIEN.